(12) United States Patent
Blakborn

(10) Patent No.: US 11,691,524 B2
(45) Date of Patent: Jul. 4, 2023

(54) ELECTRICAL PLUG-IN CONNECTION, VEHICLE AND METHOD FOR LOCKING AN ELECTRICAL PLUG-IN CONNECTION

(71) Applicant: Rosenberger Hochfrequenztechnik GmbH & Co. KG, Fridolfing (DE)

(72) Inventor: Willem Blakborn, Inzell (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 3 days.

(21) Appl. No.: 17/273,020

(22) PCT Filed: Aug. 29, 2019

(86) PCT No.: PCT/EP2019/073150
§ 371 (c)(1),
(2) Date: Mar. 3, 2021

(87) PCT Pub. No.: WO2020/048872
PCT Pub. Date: Mar. 12, 2020

(65) Prior Publication Data
US 2021/0339638 A1    Nov. 4, 2021

(30) Foreign Application Priority Data

Sep. 3, 2018  (DE) .................... 10 2018 121 397.2

(51) Int. Cl.
*B60L 53/16* (2019.01)
*H01R 13/533* (2006.01)
(Continued)

(52) U.S. Cl.
CPC ............ *B60L 53/16* (2019.02); *H01R 13/533* (2013.01); *H01R 13/62938* (2013.01);
(Continued)

(58) Field of Classification Search
CPC ............ H01R 13/62933; H01R 13/639; H01R 23/725; H01R 9/096; H01R 13/533;
(Continued)

(56) References Cited

U.S. PATENT DOCUMENTS

| 3,553,633 A | 1/1971 | Ondrejka |
| 3,614,711 A | 10/1971 | Anderson |
| 4,500,154 A | 2/1985 | Collins |
| 6,767,231 B1 * | 7/2004 | Martin ............. H01R 13/62944 439/372 |

(Continued)

FOREIGN PATENT DOCUMENTS

| CN | 103378485 A | 10/2013 |
| CN | 105742899 A | 7/2016 |

(Continued)

OTHER PUBLICATIONS

German Search Report dated Apr. 23, 2019.
(Continued)

*Primary Examiner* — Gary F Paumen
(74) *Attorney, Agent, or Firm* — Randall Danskin P.S.

(57) ABSTRACT

The invention relates to an electrical plug-in connection, comprising an electrical connector and a mating electrical connector, which can be connected to the electrical connector. The mating electrical connector has an actuating element, which can be moved between a home position ($P_0$) and a locking position ($P_1$) and is designed to cooperate with a guiding element of the electrical connector in such a way that the plug-in connection, proceeding from a pre-latching position, assumes a locked position when the actuation element is moved from the home position ($P_0$) into the locking position ($P_1$). The electrical connector has a toothing and the mating electrical connector has a mating toothing, which corresponds to the toothing of the electrical connector, the toothing and the mating toothing mesh with one another in the locked position of the plug-in connection.

18 Claims, 5 Drawing Sheets

Figure 1:
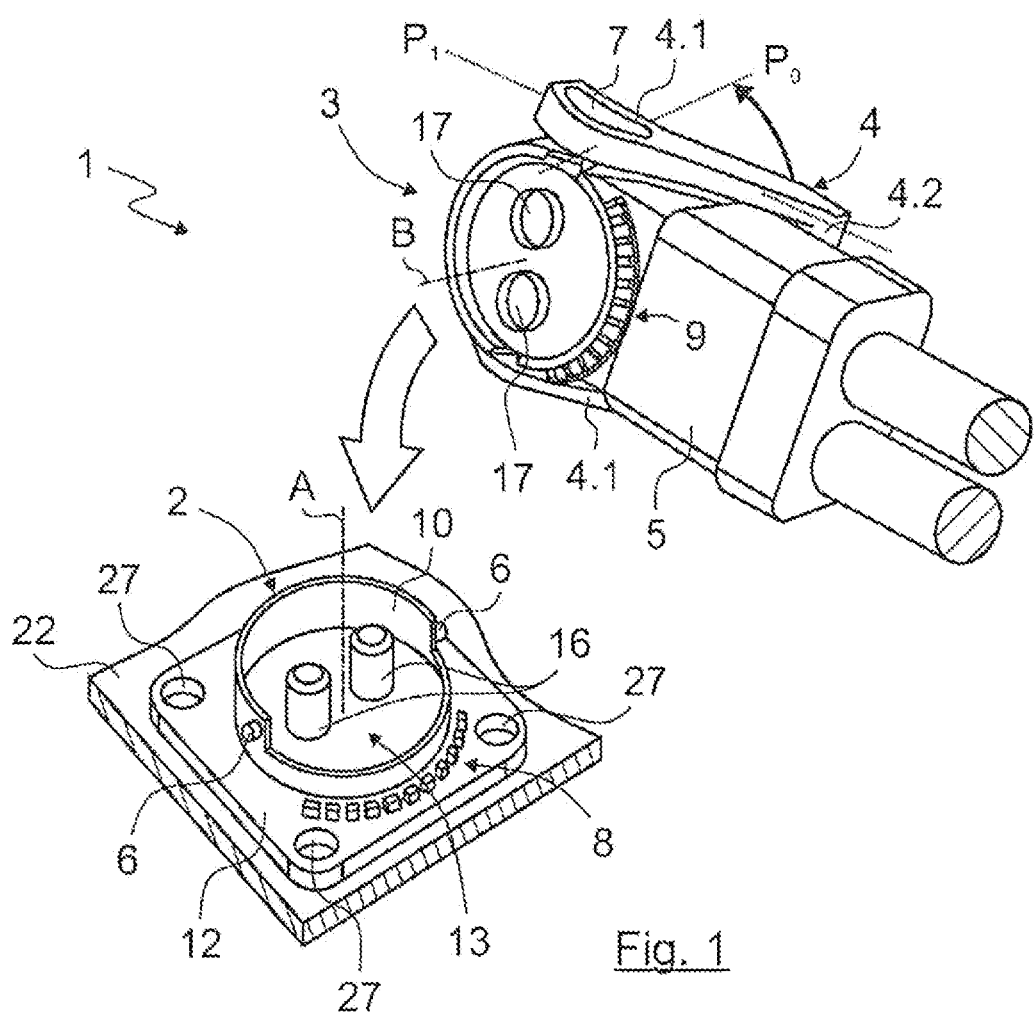

(51) Int. Cl.
*H01R 13/629* (2006.01)
*H01R 13/631* (2006.01)
*H01R 13/639* (2006.01)
*H01R 13/6596* (2011.01)
*H01R 13/74* (2006.01)
*H01R 43/26* (2006.01)
*H01R 103/00* (2006.01)

(52) U.S. Cl.
CPC ......... *H01R 13/631* (2013.01); *H01R 13/639* (2013.01); *H01R 13/6596* (2013.01); *H01R 13/748* (2013.01); *H01R 43/26* (2013.01); *H01R 2103/00* (2013.01); *H01R 2201/26* (2013.01)

(58) Field of Classification Search
CPC ............ H01R 13/62938; H01R 13/631; H01R 13/6596; H01R 13/748; H01R 43/26; H01R 2103/00; H01R 2201/26; B60L 53/16
USPC .................................................... 439/372, 74
See application file for complete search history.

(56) References Cited

U.S. PATENT DOCUMENTS

| | | | | |
|---|---|---|---|---|
| 7,241,155 B2* | 7/2007 | Tyler | ................ | H01R 13/62944 439/372 |
| 7,744,390 B2* | 6/2010 | Tyler | ................ | H01R 13/62938 439/372 |
| 2004/0248475 A1 | 12/2004 | Seminara | | |

FOREIGN PATENT DOCUMENTS

| | | |
|---|---|---|
| DE | 1515417 A1 | 8/1969 |
| DE | 8510918 U1 | 7/1985 |
| EP | 0124389 A1 | 1/1984 |
| GB | 2270805 A | 3/1994 |
| GB | 2484327 A | 4/2012 |
| GB | 2522397 A | 7/2015 |
| JP | 2002270294 A | 9/2002 |

OTHER PUBLICATIONS

Miscellaneous PCT/EP2019/073150 Documents.
Office Action issued by the State Intellectual Property Office of China dated Sep. 9, 2022.

* cited by examiner

ELECTRICAL PLUG-IN CONNECTION, VEHICLE AND METHOD FOR LOCKING AN ELECTRICAL PLUG-IN CONNECTION

RELATED APPLICATIONS

This US National Stage Utility Patent Application claims priority to German Patent Application No. 10 2018 121 397.2 which was filed on 3 Sep. 2018, and also claims priority to PCT Patent Application No. PCT/EP2019/073150 which was filed on 29 Aug. 2019 and which was published as WO 2020/048872 A1 on 12 Mar. 2020. The entire contents of the aforementioned German Patent Application, the aforementioned PCT Patent Application and the aforementioned PCT Publication are all expressly and fully incorporated herein by this reference. This claim of priority is also being made in, and is set forth in, the Application Data Sheet (ADS) filed contemporaneously herewith.

The above identified PCT Patent Application was amended, pursuant to PCT rules and Articles, during the International Phase. The amendments made pursuant to the PCT rules and Articles are to be fully incorporated herein.

BACKGROUND

The present invention relates to an electrical plug-in connection, comprising a plug-in connector and a mating plug-in connector which can be connected to the plug-in connector.

The invention further relates to a vehicle, in particular a motor vehicle, comprising an electrical plug-in connection.

Finally, the invention also relates to a method for locking an electrical plug-in connection consisting of a plug-in connector and a mating plug-in connector.

A large number of electrical plug-in connectors, in particular including electrical pin headers, are known in the field of electrical engineering. The electrical plug-in connectors serve, as is known, to transmit electrical energy and/or signals with as large a bandwidth as possible, in particular to transmit said electrical energy and/or signals to corresponding mating plug-in connectors.

Electrical plug-in connectors have contact devices of numerous embodiments. Pin contacts in particular are commonplace. Irrespective of the specific design, the various plug-in connectors are referred to as electrical plug-in connectors below.

An electrical plug-in connector or an electrical mating plug-in connector may be a plug, a built-in plug, a bushing, a coupling or an adapter. The term "plug-in connector" or "mating plug-in connector" used within the scope of the invention is representative of all variants.

Exacting requirements in respect of their robustness and the security of the plug-in connections are imposed in particular on plug-in connectors for the motor vehicle industry. Therefore, a plug-in connection has to withstand sometimes high loads, for example mechanical loads, and also remain closed in a defined manner. It is necessary to ensure that the electrical connection is not unintentionally disconnected, for example during operation of a vehicle. Furthermore, the plug-in connectors also have to ensure problem-free transmission of electrical power, signals and/or data in contaminated, damp and/or chemically aggressive environments.

The guarantee of security is paramount in particular in the case of autonomous operation of vehicles and for assistance systems.

Electrical plug-in connectors or their plug-in connector bodies can be installed on an electrical line, a cable harness, a cable or an electrical device, such as a housing of an electronic or electrical device for example.

Particular requirements are imposed on electrical plug-in connectors in particular in the high-voltage range too. High-voltage plug-in connectors are used in the vehicle sector, primarily in electric and/or hybrid vehicles, in order to supply a high-voltage battery with charging current or to draw the stored energy from the battery. Therefore, for example, plug-in connectors which are suitable for high-voltage connections are used for supply units, such as a charging box in a garage or a carport, or else at recharging stations, in order to supply a high-voltage battery of a vehicle with charging current. In this case, the electrical plug-in connector has to permanently and reliably prevent ingress of moisture and contaminants and ensure problem-free transmission of the electric charging current and possibly other electrical signals for control of the charging operation of the high-voltage battery.

The use of electrical plug-in connectors for transmitting comparatively high electrical drive energy (or else braking energy) in electric and/or hybrid vehicles requires specifically configured electrical high-voltage plug-in connectors. It should furthermore be taken into consideration that electromagnetic interference signals which can interfere with the electronics in an electronic controller, for example within a motor vehicle, are generated by alternating currents and/or switching flanks with high DC voltages. Efficient electromagnetic shielding, in particular of the electrical plug-in connectors which are used in the high-voltage range in motor vehicles, is therefore advantageous in order to prevent damage to control devices within the vehicle. Therefore, correspondingly high requirements are imposed on the shielding of the electrical plug-in connectors.

It should further be noted that electrical plug-in connections for the automotive industry, or for vehicles, have to mechanically and electrically reliably withstand the—sometimes high—vibrational loads which occur during operation of the vehicles.

EP 0 124 389 A1 relates to an electrical plug-in connection, comprising a plug-in connector and a corresponding mating plug-in connector. The plug-in connector can be connected to the mating plug-in connector by means of a thread. The plug-in connector has a tooth system and the mating plug-in connector has a mating tooth system in order to secure the plug-in connection in the locking position. Comparable plug-in connections are also described in GB 2 270 805 A and GB 2 484 327 A as well. The vibration resistance of plug-in connections of this kind can be improved in comparison to plug-in connections without a tooth system. However, as before, there is a requirement to still further increase the vibration resistance.

The present invention is based on the object of improving the electrical plug-in connections known from the prior art, in particular to increase the vibration resistance of said electrical plug-in connections.

The present invention is furthermore based on the object of providing a vehicle, in particular a motor vehicle, which has an electrical plug-in connection which has a high vibration resistance in particular.

The present invention is additionally based on the object of providing an advantageous method for locking an electrical plug-in connection consisting of a plug-in connector and a mating plug-in connector, which method ensures vibration-resistant locking of the plug-in connection in particular.

The electrical plug-in connection comprises a plug-in connector and a mating plug-in connector which can be connected to the plug-in connector. The mating plug-in connector has an operating element which is movable between a home position and a locking position and is designed to interact with a guide means of the plug-in connector in such a way that the plug-in connection, starting from a preliminary latching position, assumes a locking position when the operating element is moved from the home position to the locking position.

The electrical plug-in connection is provided, in particular, for power electronics in the motor vehicle sector. However, the invention is not limited to this. In principle, the plug-in connection according to the invention can advantageously be used within the entire field of electrical engineering or in the entire electronics sector.

The preliminary latching position is preferably an initial position, starting from which the operating element can be operated by a user or an assembly apparatus for connecting the plug-in connector to the mating plug-in connector.

Provision can be made for the plug-in connector and the mating plug-in connector to already be mechanically connected to one another in the preliminary latching position, for example to be captively connected to one another and/or to be in a state in which the electrical plug-in connection can be delivered in a manner secure for transportation.

When the electrical plug-in connection is in the locking position, the plug-in connector and the mating plug-in connector are electrically and mechanically functional for the intended use for power and/or signal transmission. In this position, the mechanical connection can have one or more locking arrangements or latching arrangements in order to securely hold the plug-in connection in the locking position.

According to the invention, provision is made for the plug-in connector to have a tooth system and for the mating plug-in connector to have a mating tooth system which corresponds to the tooth system of the plug-in connector, wherein the tooth system and the mating tooth system are in engagement with one another in the locking position of the plug-in connection.

During the course of operation of the operating element from the home position to the locking position, the tooth system therefore engages into the corresponding mating tooth system. The teeth of the tooth systems are therefore pushed axially one into the other in the plug-in direction while the operating element is operated.

The tooth system provides improvement or optimization in respect of vibrational loads of the plug-in connection. The tooth system can absorb mechanical forces in the radial direction and in the cable outlet direction and as a result keep the plug-in connector still relative to the mating plug-in connector.

On account of the high vibration resistance of the plug-in connection according to the invention, the electrical plug-in connection is suitable for transmitting electrical data signals with a high priority and/or for transmitting electrical supply signals with potential for danger or with high safety requirements (such as in the case of a high-voltage connection for example). The plug-in connection according to the invention is accordingly particularly suitable for use in a vehicle, in particular a motor vehicle.

In one development of the invention, provision can be made for the plug-in connector to be designed as a device plug-in connector or pin header.

The electrical plug-in connector is preferably an electrical pin header. Electrical pin headers are known in the motor vehicle sector, amongst others.

In one development of the invention, provision can also be made for the mating plug-in connector to be designed as a coupling or plug.

However, the type of plug-in connector or mating plug-in connector is not of importance. In principle, any desired type of plug-in connectors and mating plug-in connectors which can be connected to each other may be provided.

The invention is particularly suitable for forming a tooth system of a pin header for connection to a mating tooth system of a coupler for forming a plug-in connection in the high-voltage range. The electrical plug-in connection can particularly preferably be designed as a two-pole flat-contact plug-in connection.

In one development of the invention, provision can be made in particular for the plug-in connector to have a plug-in connector body for receiving a contact device and to have a shielding, wherein the plug-in connector body is designed for insertion into an opening of a housing part of a housing of an electronics unit. The plug-in connector body can be of multi-part design and have at least one inner plug-in connector body and one outer plug-in connector body which are positioned on opposite sides of the housing part, wherein the inner plug-in connector body can be secured in the housing of the electronics unit independently of the housing part, and wherein fastening means are provided in order to connect the plug-in connector bodies to one another in such a way that the housing part is secured between the plug-in connector bodies.

The electronics unit may preferably be a high-voltage electronics unit, in particular a high-voltage battery.

Therefore, provision can be made for the inner plug-in connector body of the plug-in connector, in addition to being fastened to the housing part, to further be secured to at least one further section of the housing.

Owing to the described development, the plug-in connector body of the plug-in connector can be easily and reliably connected to the housing part of the housing of the electronics unit. Therefore, defined positioning of the electrical plug-in connector body is achieved in a simple manner in such a way that the electrical mating plug-in connector can be reliably and securely connected to the electrical plug-in connector.

The fastening of the inner plug-in connector body of the plug-in connector in the housing can take place in any desired manner, preferably by a screw connection or by corresponding screw-on points.

It may be advantageous if the inner plug-in connector body of the plug-in connector is initially secured in the housing of the electronics unit and then the housing part, which is preferably designed as a cover, is fitted.

In this case, the inner plug-in connector body of the plug-in connector and the housing part which is provided with the opening can be positioned in relation to one another in such a way that the housing part, in particular when embodied as a cover, can be fitted onto the housing in a suitable manner, so that the inner plug-in connector body of the plug-in connector projects outward from an interior of the housing through the opening of the housing part. The outer plug-in connector body of the plug-in connector can then be fitted onto the outer side of the housing part in such a way that the inner plug-in connector body can be connected to the outer plug-in connector body with the aid of the fastening means, as a result of which the housing part, which is located between the two plug-in connector bodies, is also secured.

The fastening means are preferably of releasable design.

The fastening means are preferably designed separately from the outer plug-in connector body of the plug-in connector. The outer plug-in connector body itself is therefore not a fastening means within the scope of the invention, in particular is not a union-nut.

Provision can be made for the fastening means to be designed as screw connections.

In one development of the invention, provision can further be made for the operating element to be designed as an operating lever or operating slide and/or for the guide means to be designed as at least one guide lug, in particular as a sliding block of a slotted guide which is formed together with the operating element.

The use of an operating lever has been found to be suitable in particular. The operating lever can be arranged, for example, on the side of the mating plug-in connector, preferably on both sides, and can be pivoted through a defined angular range during the operation from the home position to the locking position, preferably through an angular range of up to 180 degrees, preferably through an angular range of approximately 90 degrees.

Closing the operating lever or operating the operating lever from the home position to the locking position can cause the tooth system to be pressed together with the mating tooth system with a small amount of force.

Provision can be made for the operating element to bear against a housing part of the mating plug-in connector in the locking position.

In principle, a plurality of operating elements and/or a plurality of guide means can also be provided.

The operating element can have recesses in which the guide means of the plug-in connector can be received. In particular, the operating lever or the operating slide can be designed as a slotted link of a slotted guide in which at least one sliding block of the plug-in connector is positively guided.

The plug-in connector preferably has two sliding blocks or guide lugs which protrude laterally, in particular orthogonally in relation to the plug-in direction, out of the outer plug-in connector body.

In one development of the invention, provision can be made for the operating element of the mating plug-in connector, in its home position in the preliminary latching position of the plug-in connection, to be in engagement with the guide means of the plug-in connector.

For example, provision can be made for the operating lever of the mating plug-in connector to have two side limbs which are arranged on the side of the mating plug-in connector and are connected along the spine of the mating plug-in connector by means of a web. The side limbs of the operating lever can have lateral recesses which, in the preliminary latching position of the plug-in connection, receive two guide lugs which protrude from both sides of the outer plug-in connector body.

In one development of the invention, provision can be made for the tooth system and/or the mating tooth system to be arranged around a center axis of the respective plug-in connector.

An arrangement of this kind is particularly suitable for absorbing radial forces by means of the tooth system or mating tooth system.

In one development, provision can be made for the tooth system and/or the mating tooth system to be arranged in the form of part of a ring or in the form of a ring around the center axis of the respective plug-in connector.

A tooth system or mating tooth system in the form of part of a ring has been found to be particularly suitable since in this case a sufficiently vibration-resistant tooth system can be provided with a comparatively low level of outlay, for example outlay of material and on manufacture.

In the case of the tooth system in the form of part of a ring, the tooth system and the mating tooth system can each be formed at least along a circumferential portion of 10 degrees, preferably of 30 degrees, particularly preferably of 60 degrees and very particularly preferably of 120 degrees, for example also 150 degrees, 180 degrees, 210 degrees, 240 degrees, 270 degrees, 300 degrees, 330 degrees up to 360 degrees.

According to the invention, provision-is made for the tooth system and the mating tooth system, when they are in engagement with one another, to be in engagement in a force-fitting manner, preferably to be pressed together elastically one into the other. The tooth system and the mating tooth system can optionally also be in engagement with one another in an interlocking manner as well.

In particular, elastic pressing-together when plugging together the plug-in connection by operating the operating element has been found to be particularly suitable in order to provide high vibration resistance of the plugged-in plug-in connection. Due to the fact that an operating element is used for connecting the plug-in connection, a sufficiently high force, for example utilizing a physical lever arm, for pressing together the tooth systems can be introduced by a user or by an assembly apparatus.

In one development, provision can further be made for the teeth of the tooth system and/or of the mating tooth system to taper to the outside, wherein the teeth of the tooth system and the teeth of the mating tooth system preferably have a different pitch from one another.

In particular, when the teeth of the tooth system and the teeth of the mating tooth system have different pitches from one another, the tooth system can be particularly well pressed-together in the locking position of the plug-in connection, while at the same time the teeth are easily "threaded" one into the other. In this case, the plug-in connection can have a high vibration resistance and holding force virtually irrespective of the manufacturing tolerances.

However, the exact design of the tooth system or mating tooth system is not of importance according to the invention. Virtually any desired geometries can be provided for the tooth system and/or mating tooth system.

Provision can be made for the tooth system and/or the mating tooth system to have at least two tooth system ribs, preferably at least six tooth system ribs, particularly preferably at least eight tooth system ribs and very particularly preferably at least ten tooth system ribs.

Provision can be made for one of the plug-in connector bodies of the electrical plug-in connector to have at least two, preferably four, bushings, preferably threaded bushings, which are arranged symmetrically around a center axis of the plug-in connector, and for the corresponding plug-in connector body to have two, preferably four, passage holes which are arranged symmetrically around the center axis of the plug-in connector, wherein the fastening means are designed as connecting elements, preferably as threaded screws, in order to connect the plug-in connector bodies of the plug-in connector to one another.

Provision can further be made for the shielding of the plug-in connector to have a cylindrical section and a plurality of shielding tabs which adjoin the cylindrical section.

The shielding tabs of the plug-in connector can have radially projecting contact points which are positioned in such a way that the contact points make contact with the housing part in the region of the opening.

Provision can further be made for the shielding of the plug-in connector to be connected to the inner plug-in connector body of the plug-in connector.

Finally, provision can be made for the contact device of the plug-in connector to be received in the inner plug-in connector body, preferably to be connected in an interlocking manner, and in particular clipped, to the inner plug-in connector body.

Furthermore, provision can be made for the contact device of the plug-in connector to have at least one, preferably two, four or more, internal conductor parts which are preferably designed as pin contacts. The mating plug-in connector can be designed in a corresponding manner thereto.

The plug-in connection can be particularly suitable for transmitting electric current, for example for charging a battery. For this purpose, provision can be made for the internal conductor parts of the plug-in connector and mating plug-in connector to be used for power supply. In the case of a configuration with two internal conductor parts, provision can be made for one internal conductor part to be connected to the electrical negative pole or ground and for the other internal conductor part to be connected to an electrical positive pole of the feed voltage. In the case of a configuration with four internal conductor parts, provision can preferably be made for the internal conductor parts to each be positioned in pairs in such a way that one pair of internal conductor parts is connected to the electrical negative pole and one pair of internal conductor parts is connected to the electrical positive pole of the feed voltage in such a way that in each case one internal conductor part of a corresponding mating plug-in connector can be inserted, respectively, between one pair of internal conductor parts of the electrical plug-in connector. As a result, particularly reliable transmission of the currents can be achieved.

In principle, provision can also be made for the contact device of the plug-in connector to be of two-pole or multipole design or for the contact device to be subdivided into a plurality of partial contact devices.

The internal conductor parts of the contact device can preferably be designed for transmitting a high-voltage and therefore as high-voltage internal conductor parts. The voltage intended for transmission can be, for example 220 volts, preferably 400 volts, but also more, for example even 110 to 1000 volts, preferably 400 to 1000 volts.

The contact device is preferably provided as a contact device for transmitting currents in electric and/or hybrid vehicles, in particular for providing the drive power and/or for charging the battery, in particular a high-voltage battery, by using the brake energy (recuperation) or by external power sources.

It may be advantageous when the contact device is designed as a high-voltage contact device and the internal conductor parts are designed as high-voltage internal conductors.

Furthermore, provision can be made for the contact device of the plug-in connector to have a high-voltage interlock (HV-interock) for monitoring for the correct connection of the plug-in connector to the mating plug-in connector.

The HV-interlock is preferably designed to monitor for the correct connection of the electrical plug-in connector to the mating plug-in connector in an electrical circuit, in particular in a high-voltage electrical circuit, with the aim of preventing an electrical hazard due to unintentional or improper isolation, or isolation caused in some other way, of the electrical circuit of power electronics, in particular of a high-voltage system in the motor vehicle sector. In order to achieve this, the power electronics can preferably have a safety circuit. Said safety circuit may be an electrical circuit to which for example a 12-volt on-board voltage is applied and which runs from the electrical plug-in connector to the electrical mating plug-in connector. If the electrical circuit of the safety circuit is interrupted due to one of the plug-in connectors being pulled out, this is identified by a control unit. The control unit can then open a high-voltage main relay or the like and disconnect the power electronics, in particular the high-voltage system. The basic design of an HV-interlock for monitoring for the correct plug-in connection is known.

Provision can further be made for the plug-in connector bodies of the plug-in connector to have a positioning device in such a way that the plug-in connector bodies of the plug-in connector can be connected to one another only with a defined orientation.

Furthermore, provision can be made for the plug-in connector together with the mating plug-in connector to form a coding device in such a way that the plug-in connector and the mating plug-in connector can be connected to one another only with a defined orientation.

In one development of the invention, provision can be made for the plug-in connector to have a guide which is designed in the form of part of a ring and is designed to allow connection of the plug-in connector to the mating plug-in connector. The mating plug-in connector can preferably have a 45-degree outlet to 135-degree outlet, particularly preferably a 90-degree outlet.

A reliable and robust contact connection between the electrical plug-in connector and the mating plug-in connector is particularly important in particular in the case of plug-in connections which are used in power electronics in the motor vehicle sector. Forming a guide, in particular a guide ring, on the electrical plug-in connector has been found to be particularly suitable in order to reliably connect to the electrical mating plug-in connector.

The guide can preferably be formed on the outer plug-in connector body of the plug-in connector. Insofar as the mating plug-in connector has an outlet which runs parallel to the longitudinal axis of the electrical plug-in connector or which runs in the plug-in direction, the electrical plug-in connector can also have a closed guide which is designed in the form of a ring.

In one development, provision can be made for the tooth system of the plug-in connector to be arranged in the form of part of a ring and opposite the guide which is in the form of part of a ring with respect to a center axis of the plug-in connector, wherein the tooth system is preferably oriented in the direction of the outlet of the mating plug-in connector when the plug-in connection is closed.

A particularly stable and vibration-resistant plug-in connection can be produced in this way.

It should be noted that features relating to the plug-in connector can likewise advantageously be implemented for the mating plug-in connector. This applies, in particular, to a two-part or multi-part construction, the shielding, the contact device and the design of the housing part and of the plug-in connector body or bodies.

The invention also relates to a vehicle, in particular a motor vehicle, comprising an electrical plug-in connection according to the above embodiments and a housing of a high-voltage electronics unit, in particular a high-voltage battery, having a housing part to which a plug-in connector is secured and having a mating plug-in connector for connection to the plug-in connector.

According to the invention, the electrical plug-in connection can advantageously be used for transmitting high data volumes, for example from various optical cameras, sensors or navigation sources, in real time. Possible fields of application are, in particular, autonomous driving, driver assistance systems, navigation, infotainment, Internet and mobile communication. However, the invention is very particularly suitable for use in high-voltage technology and, in particular, for transmitting motor and/or charging power for hybrid and electric motors. The invention may be suitable for use with voltages of up to 1000 volts at continuous currents of up to 450 amperes or more.

The invention furthermore relates to a method for locking an electrical plug-in connection consisting of a plug-in connector and a mating plug-in connector, according to which method the plug-in connection, starting from a preliminary latching position, is moved to a locking position by way of an operating element of the mating plug-in connector being moved from a home position to a locking position, wherein the operating element of the mating plug-in connector accordingly interacts with a guide means of the plug-in connector. In this case, provision is made for a tooth system of the plug-in connector and a mating tooth system of the mating plug-in connector to be brought into engagement with one another for the locking position by way of the tooth system and the mating tooth system being pressed together one into the other.

The method makes it particularly easy to close and lock the electrical plug-in connection. A robust, in particular vibration-resistant and reliable connection between the plug-in connector and the mating plug-in connector is further produced.

Features which have already been described in connection with the plug-in connection may, of course, also advantageously be implemented for the plug-in connector, the mating plug-in connector, the vehicle and the method—and vice versa. Furthermore, advantages which have already been mentioned in connection with the electrical plug-in connection can also be understood in relation to the plug-in connector, the mating plug-in connector, the vehicle and the method—and vice versa.

In addition, it should be noted that terms such as "comprising", "having" or "with" do not exclude other features or steps. Furthermore, terms such as "a" or "the" which indicate a single number of steps or features do not exclude a plurality of features or steps—and vice versa.

SUMMARY

A principal aspect of the present invention is an electrical plug-in connection (1), comprising a plug-in connector (2) and a mating plug-in connector (3) which can be connected to the plug-in connector (2), wherein the mating plug-in connector (3) has an operating element (4) which is movable between a home position ($P_0$) and a locking position ($P_1$) and is designed to interact with a guide means (6) of the plug-in connector (2) in such a way that the plug-in connection (1), starting from a preliminary latching position, assumes a locking position when the operating element (4) is moved from the home position ($P_0$) to the locking position ($P_1$), wherein the plug-in connector (2) has a tooth system (8) and the mating plug-in connector (3) has a mating tooth system (9) which corresponds to the tooth system (8) of the plug-in connector (2), wherein the tooth system (8) and the mating tooth system (9) are in engagement with one another in the locking position of the plug-in connection (1), characterized in that the tooth system (8) and the mating tooth system (9), when they are in engagement with one another, are in engagement in a force-fitting manner, preferably are pressed together elastically one into the other.

A further aspect of the present invention is a plug-in connection (1), characterized in that the plug-in connector (2) is designed as a device plug-in connector or pin header and/or the mating plug-in connector (3) is designed as a coupling or plug.

A further aspect of the present invention is a plug-in connection (1), characterized in that the plug-in connector (2) has a plug-in connector body for receiving a contact device (13) and has a shielding (18), wherein the plug-in connector body is designed for insertion into an opening (21) of a housing part (22) of a housing (23) of an electronics unit (15), and wherein the plug-in connector body is of multi-part design and has at least one inner plug-in connector body (11) and one outer plug-in connector body (12) which are positioned on opposite sides of the housing part (22), wherein the inner plug-in connector body (11) can be secured in the housing (23) of the electronics unit (15) independently of the housing part (22), and wherein fastening means (25) are provided in order to connect the plug-in connector bodies (11, 12) to one another in such a way that the housing part (22) is secured between the plug-in connector bodies (11, 12).

A further aspect of the present invention is a plug-in connection (1), characterized in that the operating element (4) is designed as an operating lever or operating slide and/or in that the guide means (6) is designed as at least one guide lug, in particular as a sliding block of a slotted guide which is formed together with the operating element.

A further aspect of the present invention is a plug-in connection (1), characterized in that the operating element (4) of the mating plug-in connector (3), in its home position ($P_0$) in the preliminary latching position of the plug-in connection (1), is in engagement with the guide means (6) of the plug-in connector (2).

A further aspect of the present invention is a plug-in connection (1), characterized in that the tooth system (8) and/or the mating tooth system (9) are arranged around a center axis (A, B) of the respective plug-in connector (2, 3).

A further aspect of the present invention is a plug-in connection (1), characterized in that the tooth system (8) and/or the mating tooth system (9) are/is arranged in the form of part of a ring or in the form of a ring around the center axis (A, B) of the respective plug-in connector (2, 3).

A further aspect of the present invention is a plug-in connection (1), characterized in that the tooth system (8) and the mating tooth system (9), when they are in engagement with one another, are in engagement in an interlocking manner.

A further aspect of the present invention is a plug-in connection (1), characterized in that the teeth of the tooth system (8) and/or of the mating tooth system (9) taper to the outside, wherein the teeth of the tooth system (8) and the teeth of the mating tooth system (9) preferably have a different pitch from one another.

A further aspect of the present invention is a plug-in connection (1), characterized in that the plug-in connector (2) has a guide (10) which is designed in the form of part of a ring and is designed to allow connection of the plug-in connector (2) to the mating plug-in connector (3) which has a 45-degree outlet to 135-degree outlet, preferably a 90-degree outlet.

A further aspect of the present invention is a plug-in connection (1), characterized in that the tooth system (8) of the plug-in connector (2) is arranged in the form of part of a ring and opposite the guide (10) which is in the form of part of a ring with respect to a center axis (A) of the plug-in connector (2), wherein the tooth system (8) is preferably oriented in the direction of the outlet of the mating plug-in connector (3) when the plug-in connection (1) is closed.

A further aspect of the present invention is a plug-in connector (2), in particular a device plug or an electrical pin header for power electronics in the motor vehicle sector, for use in an electrical plug-in connection.

A further aspect of the present invention is a mating plug-in connector (3), in particular a coupler or a plug for power electronics in the motor vehicle sector, for use in an electrical plug-in connection.

A still further aspect of the present invention is a vehicle, in particular a motor vehicle, comprising an electrical plug-in connection (1) and a housing (23) of a high-voltage electronics unit, in particular of a high-voltage battery (15), having a housing part (22) to which a plug-in connector (2) is secured and having a mating plug-in connector (3) for connection to the plug-in connector (2).

An even still further aspect of the present invention is a method for locking an electrical plug-in connection (1) consisting of a plug-in connector (2) and a mating plug-in connector (3), according to which method the plug-in connection (1), starting from a preliminary latching position, is moved to a locking position by way of an operating element (4) of the mating plug-in connector (3) being moved from a home position ($P_0$) to a locking position ($P_1$), wherein the operating element (4) of the mating plug-in connector (3) accordingly interacts with a guide means (6) of the plug-in connector (2), characterized in that a tooth system (8) of the plug-in connector (2) and a mating tooth system (9) of the mating plug-in connector (3) are brought into engagement with one another for the locking position by way of the tooth system (8) and the mating tooth system (9) being pressed together one into the other.

An exemplary embodiment of the invention will be described in greater detail below with reference to the drawings.

BRIEF DESCRIPTIONS OF THE DRAWINGS

Here, the figures show a preferred exemplary embodiment in which individual features of the present invention are illustrated in combination with one another. However, the features of the exemplary embodiment can also be implemented separately from the other features of the exemplary embodiment and can accordingly be readily combined by a person skilled in the art to form further useful combinations and sub-combinations.

In the figures, functionally identical elements are provided with the same reference signs.

FIG. 1 schematically shows a perspective view of the electrical plug-in connection, comprising the plug-in connector and the mating plug-in connector.

Figure 2:
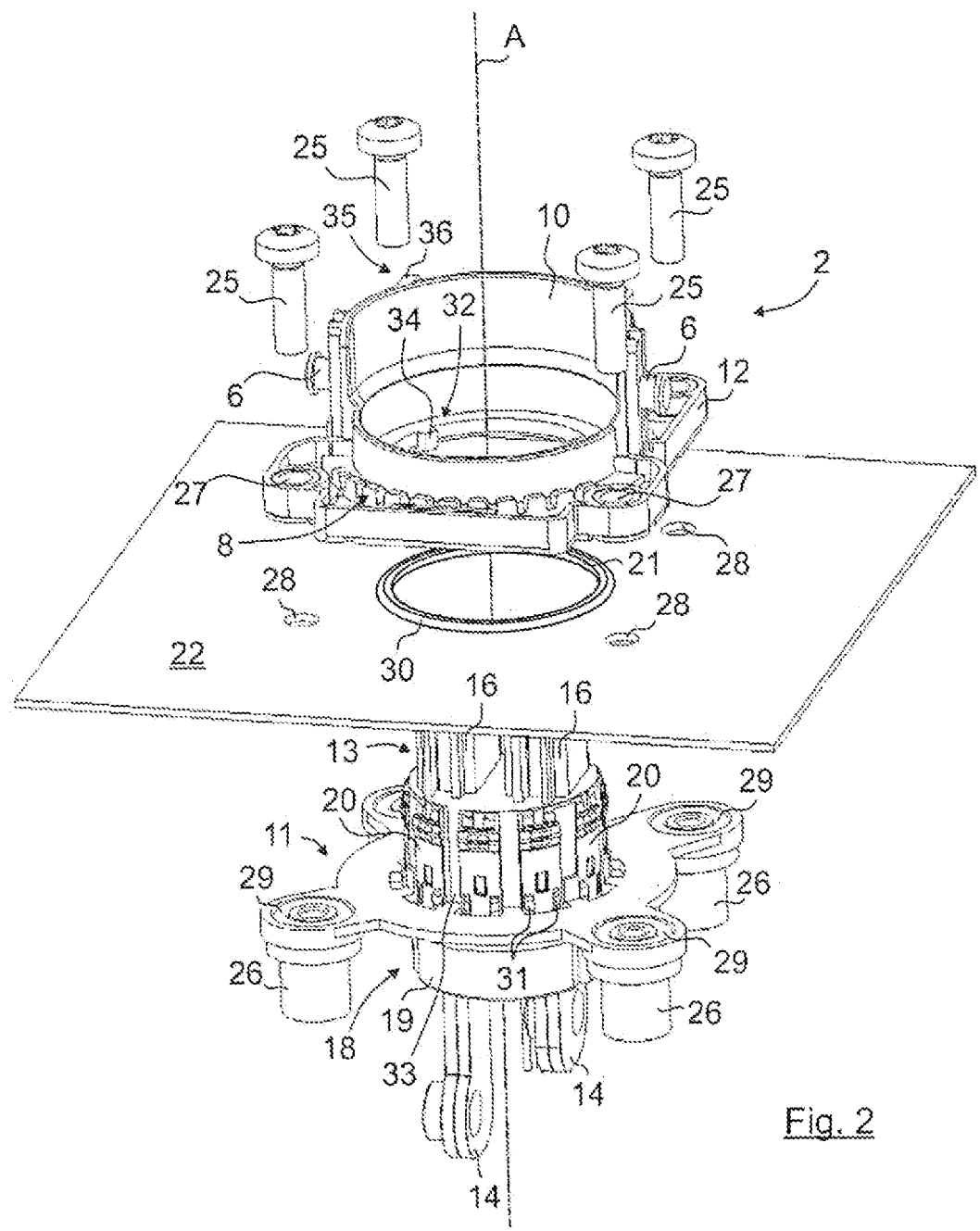

FIG. 2 schematically shows an exploded illustration of a further refinement of the electrical plug-in connector, having an inner plug-in connector body, a housing part and an outer plug-in connector body.

Figure 3:
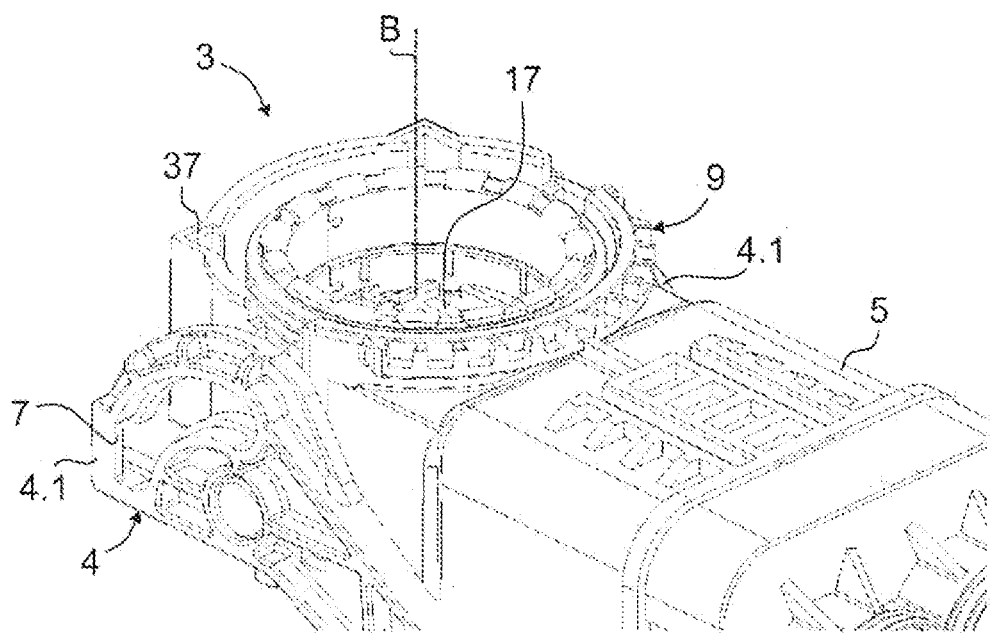

FIG. 3 schematically shows a perspective view of an electrical mating plug-in connector which corresponds to the plug-in connector of FIG. 2.

Figure 4:
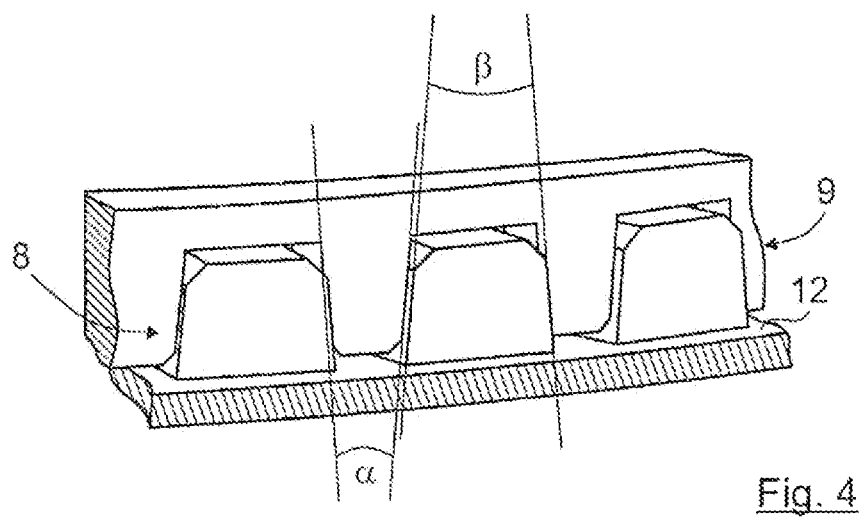

FIG. 4 schematically shows a perspective detail of a tooth system of the plug-in connector, which tooth system is pressed together with a mating tooth system of the mating plug-in connector.

Figure 5:
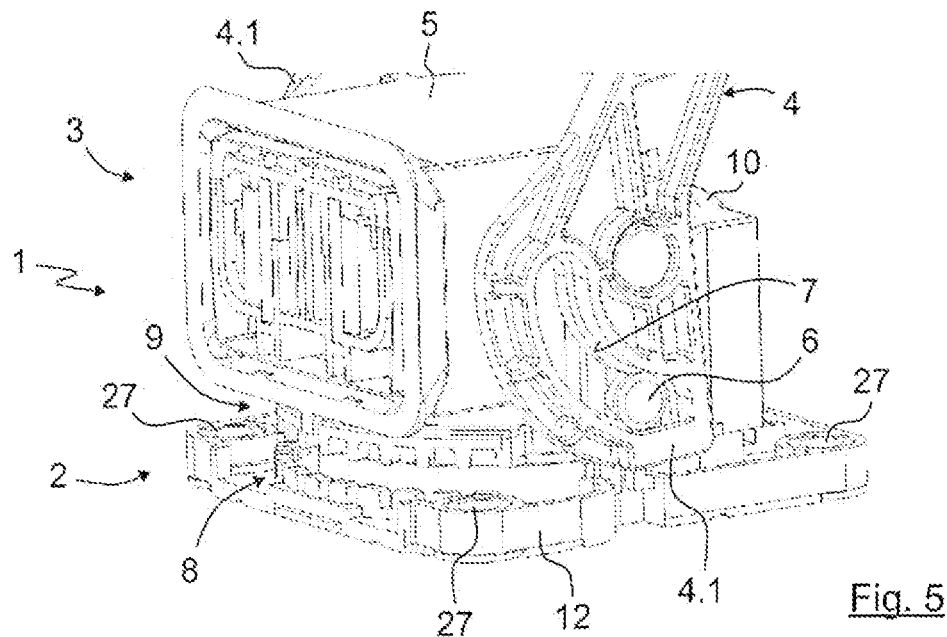

FIG. 5 schematically shows a perspective view of the plug-in connector of FIG. 2, and the mating plug-in connector of FIG. 3, in a preliminary latching position.

Figure 6:
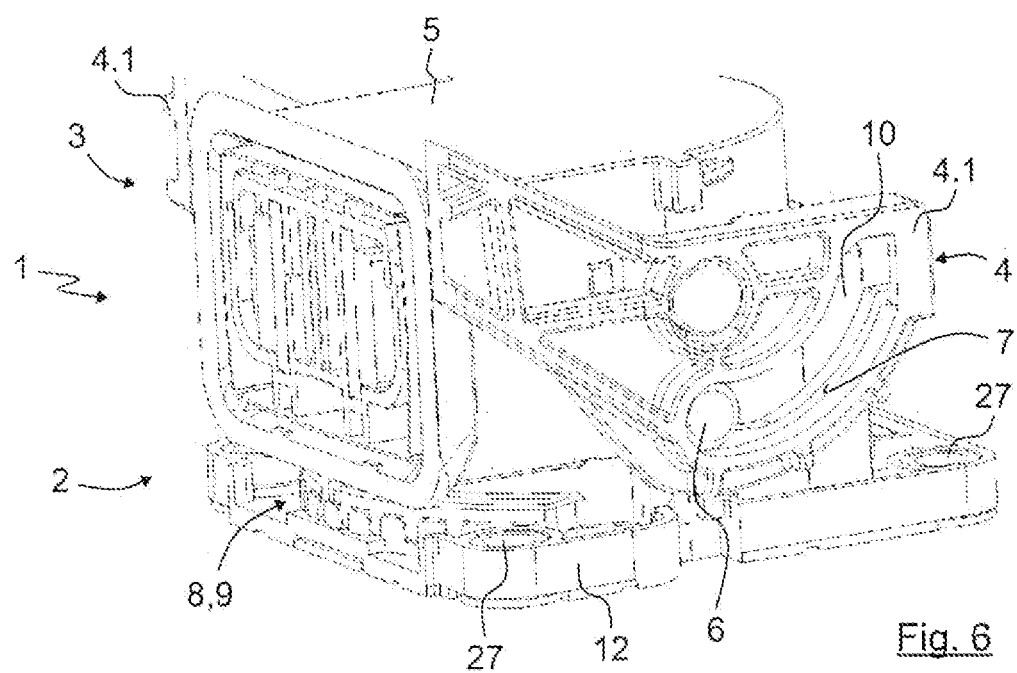

FIG. 6 schematically shows a perspective view of the plug-in connector of FIG. 2, and the mating plug-in connector of FIG. 3, in a locking position.

Figure 7:
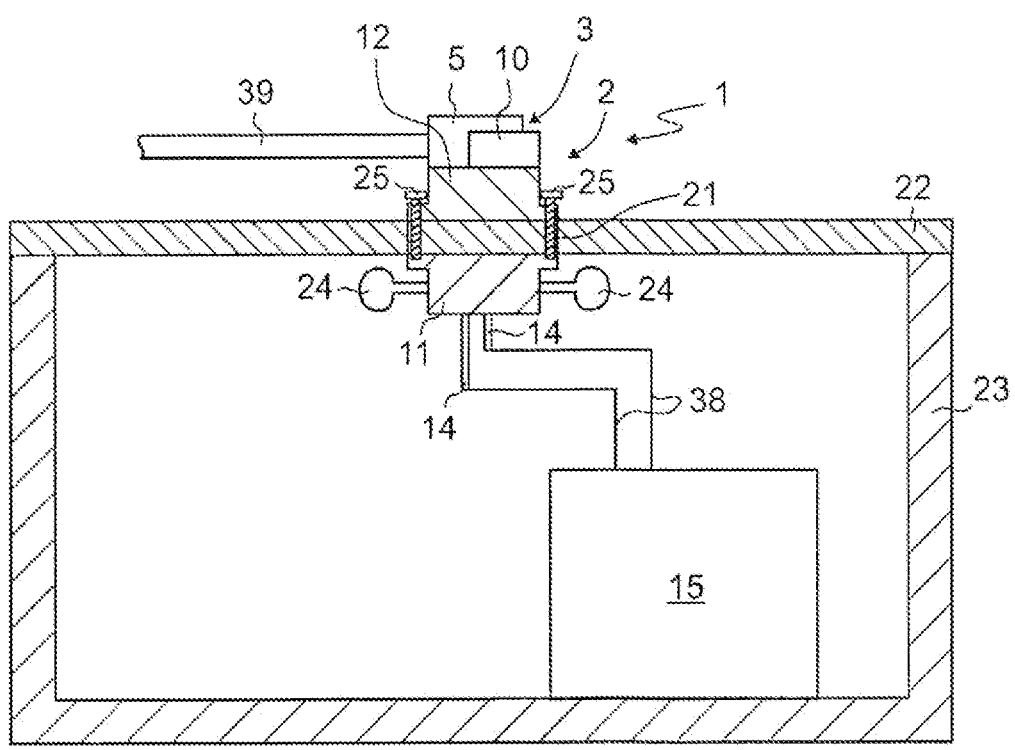

FIG. 7 schematically shows a basic illustration of a high-voltage system housing of a high-voltage electronics unit, in particular of a high-voltage battery and a high-voltage cable set, having an electrical plug-in connector and a preassembled cable with a corresponding mating plug-in connector.

DETAILED WRITTEN DESCRIPTION OF THE PREFERRED EMBODIMENTS

This disclosure of the invention is submitted in furtherance of the Constitutional purposes of the U.S. Patent laws "to promote the progress of science and useful arts." (Article 1, Section 8).

FIG. 1 shows, in simplified form, one embodiment of the electrical plug-in connection 1, comprising a plug-in connector 2 and a mating plug-in connector 3 which can be connected to the plug-in connector 2. In the exemplary embodiment, the plug-in connector 2 is designed as a pin header and the mating plug-in connector 3 is designed as a coupling. However, the type of plug-in connector 2 or mating plug-in connector 3 is not of importance within the scope of the invention.

For better illustration, a state of the plug-in connection 1 in which the plug-in connector 2 and the mating plug-in connector 3 are not mechanically connected to one another and are not yet in the preliminary latching position is shown in FIG. 1.

The mating plug-in connector 3 has an operating element 4 which is movable between a home position $P_0$ and a locking position $P_1$ and which is designed as an operating lever 4 in the exemplary embodiment. In the exemplary embodiment, the operating lever 4 has two side limbs 4.1 which are connected to one another by means of a web 4.2 (can be seen only in FIG. 1). However, in principle, the operating element 4 can also be designed in a different way to this, for example as an operating slide.

In the unconnected state of the plug-in connection 1 of FIG. 1, the operating lever 4 is in its locking position $P_1$ and bears against the housing 5 of the mating plug-in connector 3 so as to save space. Therefore, it is necessary first to move the operating lever 4 to its home position $P_0$ before the plug-in connection 1 is mechanically connected.

The operating element 4 or the operating lever 4 is designed to interact with a guide means 6 of the plug-in connector 2 in such a way that the plug-in connection 1, starting from a preliminary latching position (cf. FIG. 5), assumes a locking position (cf. FIG. 6) when the operating element or the operating lever 4 is moved from the home position $P_0$ to the locking position $P_1$. In the exemplary embodiment, the guide means 6 is designed as two guide lugs 6 which protrude from the side of the plug-in connector 2. In order to receive the guide lugs 6, the side limbs 4.1 of the operating lever 4 each have lateral recesses 7. In the exemplary embodiment, the guide lugs 6 form the sliding blocks of a slotted guide which results together with the operating lever 4.

According to the invention, the plug-in connector 2 has a tooth system 8 and the mating plug-in connector 3 has a mating tooth system 9 which corresponds to the tooth system 8 of the plug-in connector 2. The tooth system 8 and the mating tooth system 9 are in engagement with one another in the locking position (cf. FIG. 6) of the plug-in connection 1.

The tooth system 8 and the mating tooth system 9 are each arranged around a center axis A, B of the corresponding plug-in connector 2, 3. It has been found to be advantageous here for the tooth system 8 and the mating tooth system 9 to each be arranged around the center axis A, B of the respective plug-in connector 2, 3 only in the form of part of a ring since in this way the design of the electrical plug-in connection 1 can be simplified but high vibration resistance can nevertheless be ensured. However, it goes without saying that a completely annular or closed arrangement of the tooth system 8 and/or of the mating tooth system 9 is possible.

A guide 10, which is designed in the form of part of a ring, of the plug-in connector 2 is further provided in the exemplary embodiment, which guide 10 is designed to allow connection of the plug-in connector 2 to the mating plug-in connector 3 which has a 90-degree outlet in the exemplary embodiment. In the present case, the tooth system 8 of the plug-in connector 2 is arranged opposite the guide 10 which is in the form of part of a ring with respect to the center axis A of the plug-in connector 2 and faces in the direction of the outlet of the mating plug-in connector 8 when the plug-in connection 1 is closed.

FIG. 2 shows a more detailed illustration of a further refinement of a plug-in connector 2 designed as a pin header. The plug-in connector 2 of FIG. 2 is particularly suitable for connection to the further mating plug-in connector 3 illustrated in FIG. 3, the features of which correspond substantially to those of the mating plug-in connector 3 of FIG. 1, and therefore repeated description thereof is dispensed with.

The electrical plug-in connector 2 is particularly suitable for use for power electronics in the motor vehicle or electronics sector.

In the exemplary embodiment, the electrical plug-in connection 1 is designed as a plug-in connection 1 for the high-voltage range, preferably as a constituent part of a high-voltage cable set and this in turn preferably as a constituent part of a high-voltage system. However, the exemplary embodiment should not be understood as being limited to this.

The electrical plug-in connector 2 has a multi-part plug-in connector body which is made up of an inner plug-in connector body 11 and an outer plug-in connector body 12 in the exemplary embodiment. The inner plug-in connector body 11 is not illustrated in FIGS. 1, 5 and 6.

As is shown in FIG. 2, the inner plug-in connector body 11 receives a contact device 13. The contact device 13 can be connected to the inner plug-in connector body 11 in any desired manner. In the exemplary embodiment, provision is made for the contact device 13 to be plugged into the inner plug-in connector body 11 and preferably to be interlocking, in particular hooked or clipped in, there.

Current connections 14 in the form of connection lugs are provided in the exemplary embodiment in order to be able to contact-connect the contact device 13, for example to an electronics unit 15 (cf. FIG. 7) described further below.

In the exemplary embodiment, the current connections 14 are connected to internal conductor parts 16 which are designed to transmit electric current to accordingly correspondingly designed internal conductor parts 17 (cf. FIG. 1) of the mating plug-in connector 3.

Any desired number of internal conductor parts 16, 17 and any desired geometries of the internal conductor parts 16, 17 can be provided.

The contact device 13 can be designed to transmit electric currents and/or data with any desired frequencies and/or data rates. In the exemplary embodiment, provision is made for the contact device 13 to be used for the high-voltage range for use with high voltages, in particular 220 volts and higher, preferably 400 to 1000 volts.

In the exemplary embodiment, the contact device 13 has a circular outer circumference. However, the shape of the contact device 13 can be designed as desired, for example including, but not limited to, in a square or rectangular shape. However, a circular outer circumference, in particular including a concentric or symmetrical design of the contact device 13, has been found to be suitable.

The internal conductor parts 16 of the contact device 13 can be designed (as illustrated in FIG. 2) in the form of a plate or else as pin contacts (as illustrated in FIG. 1). Other configurations are also possible within the scope of the invention.

The inner plug-in connector body 11 has an electromagnetic shielding 18. In particular, electromagnetic interference signals, which can adversely affect the electronics, for example in a motor vehicle, in particular the electronic controllers, such as a motor controller for example, there, can be generated by alternating currents and/or switching processes of a DC voltage. The exemplary embodiment shows a particularly suitable embodiment of the shielding 18. The shielding 18 has a cylindrical section 19 and a plurality of shielding tabs 20 which adjoin the cylindrical section 19. The mating plug-in connector 3 is preferably configured in such a way that it likewise has a shielding (not illustrated) which makes at least partial radial contact with the shielding tabs 20. The shielding tabs 20 are preferably of resilient design in order to establish a good connection with the shielding of the mating plug-in connector 3.

In the exemplary embodiment, the shielding 18 is connected to the inner plug-in connector body 11. The inner plug-in connector body 11 and the shielding 18 are plugged into an opening 21 defined in a housing part 22 of a housing 23 together.

The housing 23 can accommodate an electronics unit 15 (cf. FIG. 7). In the exemplary embodiment, the electronics unit 15 is preferably designed as a high-voltage electronics unit, in particular as a high-voltage battery 15.

Particularly advantageous connection of the inner plug-in connector body 11 to the housing 23 or to the housing part 22 results from the inner plug-in connector body 11 first being secured in the housing 23. The securing operation can be performed in any desired manner. In the exemplary embodiment, FIG. 7 shows in a basic illustration that the inner plug-in connector body 11 is secured at screw-on points 24. The inner plug-in connector body 11 can be configured in a manner corresponding thereto (not illustrated in any detail). It is advantageous when the inner plug-in connector body 11 is first secured in the housing 23 and then the housing part 22 which is provided with the opening 21 is fitted or the inner plug-in connector body 11 is inserted into the opening 21. For this purpose, the inner plug-in connector body 11 is secured in a correspondingly suitable position in the housing 235, so that the opening 21 and the contact device 13 which is inserted into the inner plug-in connector body 11 are in concentric alignment with one another, so that the contact device 13 can penetrate the opening 21 from an interior of the housing 23 to the outside.

In the exemplary embodiment, provision is made for the housing part 22 to be designed as a cover of the housing 23.

When the inner plug-in connector body 11 has passed through the opening 21, the outer plug-in connector body 12 is then attached to an outer side of the housing part 22. This is illustrated in the exploded illustration of FIG. 2. The outer plug-in connector body 12 and the inner plug-in connector body 11 are secured with the aid of a fastening means 25 in such a way that the housing part 22 is also secured between the plug-in connector bodies 11, 12. In the exemplary embodiment, the fastening means are designed as screw connections, in particular as threaded screws 25.

In the exemplary embodiment, provision is further made for the inner plug-in connector body 11 to have at least two, in the exemplary embodiment four, bushings 26 which are arranged symmetrically around a center axis A of the plug-in connector 2. In the exemplary embodiment, the bushings 26 are designed as threaded bushings 26. The outer plug-in connector body 12 correspondingly has at least two, in the exemplary embodiment four, passage holes 27 which are arranged symmetrically around the center axis A of the plug-in connector 2.

In the exemplary embodiment, provision is made for the housing part 22 to have holes 28 which are in alignment with the threaded bushings 26 or the passage holes 27.

Seals which are embodied as O-rings 29 are further provided in the exemplary embodiment in order to seal off the holes 28 in the housing part 22. In the exemplary embodiment, provision is made for the O-rings 29 to be placed into the threaded bushings 26. The threaded bushings 26 preferably have recesses which correspond thereto.

A seal 30 is analogously likewise provided in order to seal off the opening 21. In the exemplary embodiment, a sealing ring 30 which is positioned between the outer side of the housing part 22 and the outer plug-in connector body 12 and encircles the opening 21 (only illustrated in FIG. 2) serves for this purpose.

As can be gathered from FIG. 2, the shielding tabs 20 and/or alternatively (but not illustrated) the cylindrical section 19 of the shielding 18 have/has contact points 31 which are positioned in such a way that the contact points 31 make contact with the housing part 22 in the region of the opening 21. For this purpose, the contact points 31 preferably protrude radially beyond the shielding tabs 20. Reliable electrical connection between the shielding 18 and the housing part 22, which is preferably of electrically conductive design, in particular is designed as a sheet metal part or else as a cast part, is established by the contact points 31.

As can be gathered from FIG. 2, the plug-in connector bodies 11, 12 have a positioning device 32 in such a way that the plug-in connector bodies 11, 12 can be connected to one another only with a defined orientation. In the exemplary embodiment, provision is made for the positioning device 32 to have at least one, in the exemplary embodiment a plurality of, preferably three to four, positioning grooves 33 and positioning lugs 34 which correspond thereto.

In the exemplary embodiment, the positioning grooves 33 are formed on the inner plug-in connector body 11 and run in the axial direction between two shielding tabs 20. The outer plug-in connector body 12 has positioning lugs 34 which correspond thereto and which, when the outer plug-in connector body 12 is correctly fitted to the inner plug-in connector body 11, are inserted into the corresponding positioning grooves 33 so as to run in the axial direction A. In the exemplary embodiment, provision is made for the plug-in connector bodies 11, 12 to be able to be connected to one another only with precisely one orientation.

In the exemplary embodiment, provision is made for the electrical plug-in connector 2 together with the electrical mating plug-in connector 3 to form a coding device 35 (cf. FIG. 2) in such a way that the plug-in connector 2 and the mating plug-in connector 3 can be connected to one another only with a defined orientation. In the exemplary embodiment, provision is made for the electrical plug-in connector 2 and the electrical mating plug-in connector 3 to be able to be connected to one another only with precisely one orientation.

A coding element 36, which is associated with the outer plug-in connector body 12, of the coding device 35 is illustrated in FIG. 2 and a corresponding mating coding element 37 for receiving the coding element 36 is illustrated in FIG. 3. Mechanical codings of this kind, in order to connect the electrical plug-in connector 2 and the electrical mating plug-in connector 3 to one another, are known in principle from the prior art.

FIG. 4 illustrates the tooth system 8 and the mating tooth system 9 while they are in engagement with one another in the locking position of the plug-in connection 1. Provision can be made here, as illustrated in the exemplary embodiment, for the tooth system 8 and the mating tooth system 9 to be in engagement in an interlocking and force-fitting manner, preferably to be pressed together elastically one into the other. For this purpose, it may be advantageous when the teeth of the tooth system 8 and the teeth of the mating tooth system 9 taper to the outside, wherein the teeth of the tooth system 8 and the teeth of the mating tooth system 9 preferably have a different pitch from one another (different angles $\alpha$ and $\beta$), this advantageously allowing said tooth system and mating tooth system to be able to be pressed together.

For better insertion of the tooth system 8 into the mating tooth system 9, the individual teeth of the tooth system 8 and/or of the mating tooth system 9 can have bevels or chamfers, as illustrated in FIG. 4.

FIG. 5 shows a perspective, partially sectioned view of the electrical plug-in connection 1 in the preliminary latching position. In FIG. 6, the electrical plug-in connection 1 is illustrated in the locking position. It can be seen that the operating element or the operating lever 4 of the mating plug-in connector 3, in its home position $P_0$, is in engagement with the guide means or with the two guide lugs 6 of the plug-in connector 2 in the preliminary latching position of the plug-in connection 1. When the operating lever 4 is operated from the home position $P_0$ to the locking position $P_1$, the electrical plug-in connection 1 can be reliably and easily closed by the positive or slotted guide provided as a result. On account of the physical lever arm 4, the tooth system 8 can already be strongly pressed in the mating tooth system 9 with a comparatively small amount of force.

The invention also relates to a vehicle, in particular to a motor vehicle, comprising an electrical plug-in connection 1 according to the above embodiments. In this case, a housing 23 of a high-voltage unit, in particular of a high-voltage battery, having a housing part 22, to which the plug-in connector 2 is secured, and having a mating plug-in connector 3 for connection to the plug-in connector 2 can be provided in particular, as illustrated in FIG. 7.

FIG. 7 shows a basic design of a high-voltage system having the electrical plug-in connector 2 and the electrical mating plug-in connector 3. Said Figure also illustrates the housing 23 which accommodates the electronics unit 15 which is preferably a high-voltage electronics unit, in particular a high-voltage battery 15. The high-voltage battery 15 is connected to the current connections 14 of the electrical plug-in connector 2 via cables 38. In this case, the housing part 22 is preferably a cover of the housing 23. The electrical mating plug-in connector 3 is illustrated as part of a preassembled cable 39 in FIG. 7, that is to say the preassembled cable 39 comprises the electrical mating plug-in connector 3.

Operation

Having described the structure of my electrical plug-in connection, vehicle and method for locking an electrical plug-in connection, its operation is briefly described.

The electrical plug-in connector 2, and the mating electrical plug-in connector 3 are oriented, relative to one another so that the center axis A of the electrical plug-in connector 2, is adjacent to and coaxially aligned with the center axis B of the mating electrical plug-in connector 3, and the guide 10 carried by the electrical plug-in connector 2 is oriented correctly with the outlet defined by the mating electrical plug-in connector 3. Similarly, the tooth system 8, and the mating tooth system 9, each composed of a plurality of tapered teeth, are aligned for engagement.

The operating element 4 is initially placed in its home position $P_0$ relative to the body 5 of the mating electrical plug-in connector 3, and the guide means 6 (guide lugs 6) carried by the electrical plug-in connection 2 are at least partially with in the slotted guide 7 of the operating element 4. The operating element 4 is moved from the home position $P_0$ into the locking position $P_1$ which responsively causes the guide lugs 6 to slidably engage with the slotted guide 7 which responsively moves the mating electrical plug-in connector 3 axially closer to the electrical plug-in connection 2 and responsively causes the tooth system 8 of the electrical plug-in connection 2 to frictionally engage with the mating tooth system 9 of the mating electrical plug-in connection 3 so as to generate a secure and robust electrical interconnection therebetween for secure and robust transmission of electrical energy and electrical signals.

A principal object of the present invention is a method for locking an electrical plug-in connection 1 consisting of a plug-in connector 2 and a mating plug-in connector 3, the method comprising the steps: providing a plug-in connector 2, the plug-in connector 2 having, a guide means 6, and a tooth system 8; and providing a mating plug-in connector 3 which can be connected to the plug-in connector 2, the mating plug-in connector 3 having, a mating tooth system 9 that corresponds to the tooth system 8 of the plug-in connector 2, and an operating element 4 that interacts with the guide means 6 of the plug-in connector 2, and the operating element 4 is movable between a home position $P_0$ and a locking position $P_1$; and orienting the plug-in connector 2 and the mating plug-in connector 3 in a preliminary latching position; moving the operating element 4 of the mating plug-in connector 3 from the home position $P_0$ to the locking position $P_1$; and the tooth system 8 of the plug-in connector 2 and the mating tooth system 9 of the mating plug-in connector 3 are brought into engagement with one another and into the locking position by the tooth system 8 and the mating tooth system 9 being pressed together one into the other responsive to movement of the operating element 4 from the home position $P_0$ into the locking position $P_1$.

A further object of the present invention is an electrical plug-in connection 1, comprising: a plug-in connector 2, the plug-in connector 2 having, a guide means 6, and a tooth system 8; and a mating plug-in connector 3 which can be connected to the plug-in connector 2, the mating plug-in connector 3 having, a mating tooth system 9 that corresponds to the tooth system 8 of the plug-in connector 2, and an operating element 4 that interacts with the guide means 6 of the plug-in connector 2 and the operating element 4 is movable between a home position $P_0$ and a locking position $P_1$; and the electrical plug-in connection 2, starting from a preliminary latching position, assumes a locking position when the operating element 4 is moved from the home position $P_0$ to the locking position $P_1$; and the tooth system 8 and the mating tooth system 9 are in engagement with one another in the locking position of the plug-in connection.

A further object of the present invention is an electrical plug-in connection 1 wherein the plug-in connector 2 is a device plug-in connector or a pin header.

A further object of the present invention is an electrical plug-in connection 1 further comprising: a plug-in connector body of the electrical plug-in connector 2, and the plug-in connector body is configured for receiving a contact device 13 therein; and a shielding 18 carried by the plug-in connector body; and the plug-in connector body is designed for insertion into an opening 21 defined in a housing part 22 of a housing 23 of an electronics unit 15; and the plug-in connector body comprises an inner plug-in connector body 11 and an outer plug-in connector body 12 and the inner plug-in connector body 11 and the outer plug-in connector body 12 are positioned on opposite sides of the housing part 22; and the inner plug-in connector body 11 can be secured in the housing 23 of the electronics unit 15, independently of the housing part 22; and fastening means 25 connect the inner plug-in connector body 11 and the outer plug-in connector body 12 to one another in such a way that the housing part 22 is secured between the inner and outer plug-in connector bodies 11, 12.

A further object of the present invention is an electrical plug-in connection 1 wherein, the operating element 4 is an operating lever 4, and the operating element 4 defines a slotted guide; and the guide means 6 of the plug-in connector 2 comprises at least one guide lug 6 that is a sliding block that engages in the slotted guide 7 defined in the operating element 4.

A further object of the present invention is an electrical plug-in connection 1 and wherein the operating element 4, of the mating plug-in connector 3, when in the home position $P_0$ and in the preliminary latching position of the plug-in connection 1, is in engagement with the guide means 6 of the plug-in connector 2.

A further object of the present invention is an electrical plug-in connection 1 and wherein the tooth system 8 and the mating tooth system 9 are arranged around a center axis A of the plug-in connector 2 and arranged around a center axis B of the mating plug-in connector 3.

A further object of the present invention is an electrical plug-in connection 1 wherein, the tooth system 8 and the mating tooth system 9 each define at least a portion of a ring around the center axis A, B of the respective plug-in connector 2, 3.

A further object of the present invention is an electrical plug-in connection 1 wherein the tooth system 8 and the mating tooth system 9, when they are in engagement with one another, are engaged in an interlocking manner.

A further object of the present invention is an electrical plug-in connection 1 wherein teeth of the tooth system 8, and teeth of the mating tooth system 9 taper; and the tapered teeth of the tooth system 8 and the tapered teeth of the mating tooth system 9 have a different pitch from one another.

A further object of the present invention is an electrical plug-in connection 1 and further comprising: a guide 10 carried by the plug-in connector 2, and the guide 10 is in the form of part of a ring, and the guide 10 allows connection of the plug-in connector 2 to the mating plug-in connector 3; and the mating plug-in connector 3 defines an outlet for engagement with the guide 10, and the outlet is between about 45 degrees and about 135 degrees.

A further object of the present invention is an electrical plug-in connection 1 wherein the tooth system 8 of the plug-in connector 2 is in the form of part of a ring and the tooth system 8 of the plug-in connector 2 is positioned opposite the guide 10 which is in the form of part of a ring with respect to a center axis A of the plug-in connector 2, and the tooth system 8 of the plug-in connector 2 is oriented in the direction of the outlet of the mating plug-in connector 3 when the plug-in connection 1 is closed.

A further object of the present invention is a plug-in connector 2, in particular a device plug or an electrical pin header for power electronics in the motor vehicle sector, for use in an electrical plug-in connection 1.

A further object of the present invention is a mating plug-in connector 3, in particular a coupler or a plug for power electronics in the motor vehicle sector, for use in an electrical plug-in connection 1.

A further object of the present invention is a vehicle, in particular a motor vehicle, comprising: an electrical plug-in connection 1, the electrical plug-in connection 1 having, a plug-in connector 2, the plug-in connector 2 having, a guide means 6, and a tooth system 8; and a mating plug-in connector 3 which can be connected to the plug-in connector 2, the mating plug-in connector 3 having, a mating tooth system 9 that corresponds to the tooth system 8 of the plug-in connector 2, and an operating element 4 that interacts with the guide means 6 of the plug-in connector 2, and the operating element 4 is movable between a home position $P_0$ and a locking position $P_1$; and the electrical plug-in connection 1, starting from a preliminary latching position, assumes a locking position when the operating element 4 is moved from the home position $P_0$ to the locking position $P_1$; and the tooth system 8 and the mating tooth system 9 are in engagement with one another in the locking position of the plug-in connection 1; and a housing 23 for a high-voltage electronics unit 15, having a high-voltage battery 15, and the housing 23 has a housing part 22 to which the plug-in connector 2 is secured.

A further object of the present invention is an electrical plug-in connection 1 wherein the tooth system 8 and the mating tooth system 9, when they are in engagement with one another, are engaged in a force-fitting manner.

A further object of the present invention is an electrical plug-in connection 1 wherein the tooth system 8 and the mating tooth system 9, when they are in engagement with one another, are pressed together elastically one into the other.

A still further object of the present invention is a plug-in connection 1 wherein the mating plug-in connector 3 is a coupling or a plug.

A still further object of the present invention is an electrical plug-in connector 2 wherein, the operating element 4 is an operating slide that engages with the guide means 6.

An even still further object of the present invention is a method wherein, the operating element 4 defines a slotted guide 7 that receives the guide means 6 of the plug-in connector 2; and movement of the operating element 4 from the home position $P_0$ to the locking position $P_1$ responsively causes the guide means 6 to slidably move along the slotted guide 7 and responsively lock the plug-in connector 2 to the mating plug-in connector 3.

In compliance with the statute, the present invention has been described in language more or less specific as to the structural and methodical features. It is to be understood, however, that the invention is not limited to the specific features shown and described since the means herein disclosed comprise preferred forms of putting the invention into effect. The invention is therefore claimed, in any of its forms or modifications, within the proper scope of the appended claims appropriately interpreted in accordance with the doctrine of equivalents.

The invention claimed is:

1. An electrical plug-in connection, comprising:
    a plug-in connector, the plug-in connector having,
        a guide means, and
        a tooth system; and
    a mating plug-in connector which can be connected to the plug-in connector, the mating plug-in connector having,
        a mating tooth system that corresponds to the tooth system of the plug-in connector, and
        an operating element that interacts with the guide means of the plug-in connector, and the operating element is a lever and is movable in an arc of movement about two pivot axles carried on opposing exterior side portions of the mating plug-in connector and the lever operating element is movable between a home position and a locking position; and
    the plug-in connector and the mating plug-in connector, starting from an un-latched/preliminary latching position are moved into a latched/locking position responsive to the lever operating element moving in the arc of movement from the home position to the locking position; and
    the tooth system and the mating tooth system are in engagement with one another when the operating element is in the latched/locking position; and wherein
    teeth of the tooth system and teeth the mating tooth system are pushed axially one into the other in the plug-in direction responsive to the lever operating element moving from the home position to the locking position.

2. The electrical plug-in connection as claimed in claim 1 and wherein the plug-in connector is a device plug-in connector or a pin header.

3. The electrical plug-in connection as claimed in claim 1 and wherein, the operating element is an operating lever, and the operating element defines a slotted guide means; and
    the guide means of the plug-in connector comprises at least one guide lug that is a sliding block that engages in the slotted guide means defined in the operating element.

4. The electrical plug-in connection as claimed in claim 1 and wherein the operating element, when in the home position and in the preliminary latching position of the plug-in connection, is in engagement with the guide means of the plug-in connector.

5. The electrical plug-in connection as claimed in claim 1 and wherein the tooth system and the mating tooth system are arranged around a center axis of the plug-in connector and arranged around a center axis of the mating plug-in connector.

6. The electrical plug-in connection as claimed in claim 5 and wherein, the tooth system and the mating tooth system each define at least a portion of a ring around the center axis of the respective plug-in connector.

7. The electrical plug-in connection as claimed in claim 1 and wherein the tooth system and the mating tooth system, when they are in engagement with one another, are engaged in an interlocking manner.

8. The electrical plug-in connection as claimed in claim 1 and wherein teeth of the tooth system, and teeth of the mating tooth system taper; and
the tapered teeth of the tooth system and the tapered teeth of the mating tooth system have a different pitch from one another.

9. The electrical plug-in connection as claimed in claim 1 and further comprising:
a guide carried by the plug-in connector, and the guide is in the form of part of a ring, and the guide allows connection of the plug-in connector to the mating plug-in connector; and
the mating plug-in connector defines an outlet for engagement with the guide, and the outlet is between about 45 degrees and about 135 degrees.

10. The electrical plug-in connection as claimed in claim 9 and wherein the tooth system of the plug-in connector is in the form of a partial ring and the tooth system of the plug-in connector is positioned opposite the guide which is in the form of a partial ring with respect to a center axis of the plug-in connector, and the tooth system of the plug-in connector is oriented in the direction of the outlet of the mating plug-in connector when the plug-in connection is closed.

11. The electrical plug-in connection as claimed in claim 1 and wherein the tooth system and the mating tooth system, when they are in engagement with one another, are engaged in a force-fitting manner.

12. The electrical plug-in connection as claimed in claim 1 and wherein the tooth system and the mating tooth system, when they are in engagement with one another, are pressed together elastically one into the other.

13. The plug-in connection as claimed in claim 1 and wherein the mating plug-in connector is a coupling or a plug.

14. The electrical plug-in connection as claimed in claim 1 and wherein, the operating element is an operating slide that engages with the guide means.

15. An electrical plug-in connection, comprising:
a plug-in connector, the plug-in connector having,
a guide means, and
a tooth system; and
a mating plug-in connector which can be connected to the plug-in connector, the mating plug-in connector having,
a mating tooth system that corresponds to the tooth system of the plug-in connector, and
an operating element that interacts with the guide means of the plug-in connector, and the operating element is movable between a home position and a locking position; and
the plug-in connection and the mating plug-in connection, starting from an un-latched/preliminary latching position assume a latched/locking position as the operating element is moved from the home position to the locking position; and
the tooth system and the mating tooth system are in engagement with one another when the operating element is in the locking position; and
a plug-in connector body of the electrical plug-in connector, and the plug-in connector body is configured for receiving a contact device therein; and a shielding carried by the plug-in connector body; and
the plug-in connector body is designed for insertion into an opening defined in a housing part of a housing of an electronics unit; and
the plug-in connector body comprises an inner plug-in connector body and an outer plug-in connector body and the inner plug-in connector body and the outer plug-in connector body are positioned on opposite sides of the housing part; and
the inner plug-in connector body can be secured in the housing of the electronics unit, independently of the housing part; and
fastening means connect the inner plug-in connector body and the outer plug-in connector body to one another in such a way that the housing part is secured between the inner and outer plug-in connector bodies.

16. A vehicle, in particular a motor vehicle, comprising:
an electrical plug-in connection, the electrical plug-in connection having,
a plug-in connector, the plug-in connector having,
a guide means, and
a tooth system; and
a mating plug-in connector which can be connected to the plug-in connector, the mating plug-in connector having,
a mating tooth system that corresponds to the tooth system of the plug-in connector, and
an operating element that interacts with the guide means of the plug-in connector, and the operating element is a lever and is movable in an arc of movement about two pivot axles carried on opposing exterior side portions of the mating plug-in connector and the lever operating element is movable between a home position and a locking position; and
the plug-in connector and the mating plug-in connector, starting from an un-latched/preliminary latching position are moved into a latched/locking position responsive to the lever operating element moving in the arc of movement from the home position to the locking position; and
the tooth system and the mating tooth system are in engagement with one another in the locking position of the plug-in connection; and
teeth of the tooth system and teeth the mating tooth system are pushed axially one into the other in the plug-in direction responsive to the lever operating element moving from the home position to the locking position; and
a housing for a high-voltage electronics unit, having a high-voltage battery, and the housing has a housing part to which the plug-in connection is secured.

17. A method for locking an electrical plug-in connection consisting of a plug-in connector and a mating plug-in connector, the method comprising the steps:
providing a plug-in connector, the plug-in connector having,
a guide means, and
a tooth system; and
providing a mating plug-in connector which can be connected to the plug-in connector, the mating plug-in connector having,
a mating tooth system that corresponds to the tooth system of the plug-in connector, and
an operating element that interacts with the guide means of the plug-in connector, and the operating element is a lever and is movable in an arc of movement about two pivot points carried an opposing exterior side portions of the mating plug-in connector and the lever operating element is movable between a home position and a locking position; and orienting the plug-in connector and the mating plug-in connector in a preliminary latching position, and in the preliminary latching position the guide means of the plug-in connector are positioned to interact with the lever operating element;

moving the lever operating element of the mating plug-in connector through the arc of movement from the home position to the locking position; and the tooth system of the plug-in connector and the mating tooth system of the mating plug-in connector are brought into engagement with one another and into the locking position by the tooth system and the mating tooth system being pressed axially together one into the other responsive to the movement of the lever operating element from the home position into the locking position; and teeth of the tooth system and teeth the mating tooth system are pushed axially one into the other in the plug-in direction as the lever operating element is moved through the arc of movement from the home position to the locking position.

18. The method as claimed in claim 17 and wherein, the operating element defines a slotted guide that receives the guide means of the plug-in connector; and movement of the operating element from the home position to the locking position responsively causes the guide means to slidably move along the slotted guide and responsively lock the plug-in connector to the mating plug-in connector.

\* \* \* \* \*